Jan. 3, 1939.     V. M. LYLE     2,142,906
TAG HOLDER AND LOCK
Filed Jan. 14, 1937     3 Sheets-Sheet 1
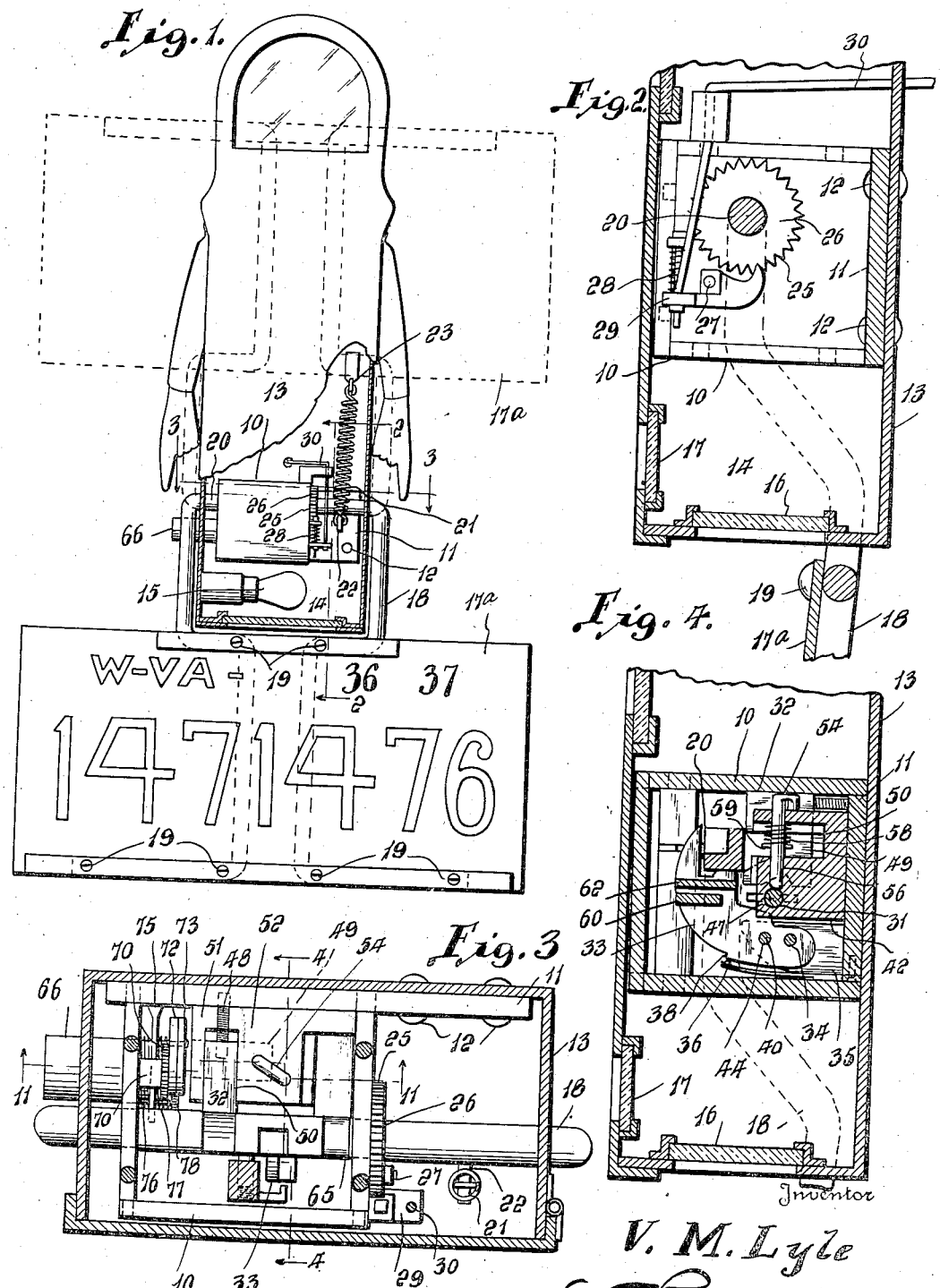

Jan. 3, 1939.　　　　V. M. LYLE　　　　2,142,906
TAG HOLDER AND LOCK
Filed Jan. 14, 1937　　　　3 Sheets-Sheet 2

Inventor
V. M. Lyle
By L. F. Randolph
Attorney

Jan. 3, 1939.   V. M. LYLE   2,142,906
TAG HOLDER AND LOCK
Filed Jan. 14, 1937   3 Sheets-Sheet 3
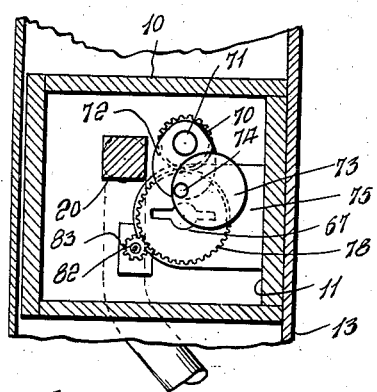
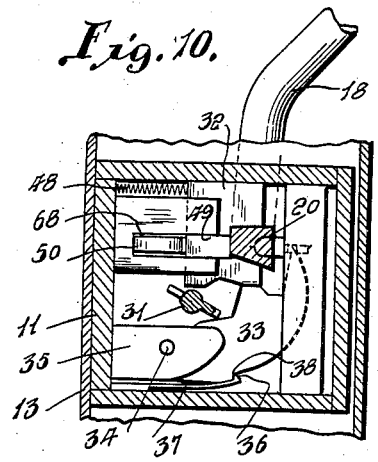
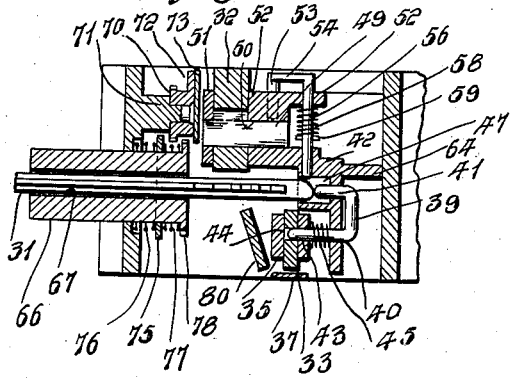
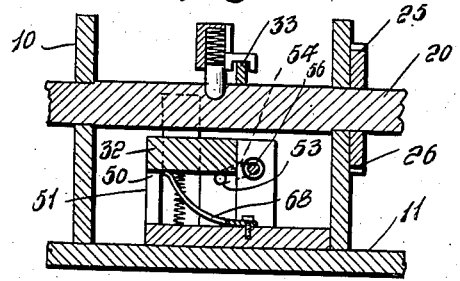
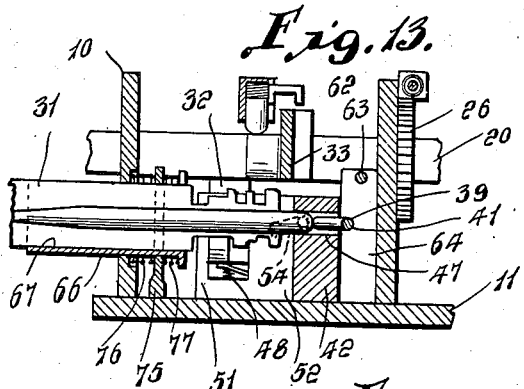
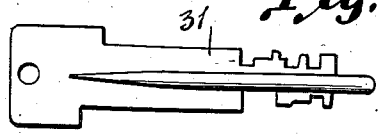
Inventor
V. M. Lyle
By L. F. Randreph
Attorney Patented Jan. 3, 1939

2,142,906

UNITED STATES PATENT OFFICE 2,142,906

TAG HOLDER AND LOCK

Vent Morgan Lyle, Bluefield, W. Va., assignor of one-fourth to Roosevelt E. Rogers, Oak Hill, W. Va., and one-fourth to Carl Mariotti, McComas, W. Va.

Application January 14, 1937, Serial No. 120,583

3 Claims. (Cl. 40—2.2)

This invention relates to a means adapted to hold an automobile license tag or the equivalent and it aims to provide novel mechanism whereby a tag may be raised or retracted when the automobile or vehicle is not in use, and the face of the tag preferably obscured, and further to provide in connection with such a tag holder or the like, a novel locking mechanism. It is to be understood that the lock may be used in other relations.

More specifically, it is aimed to provide a tag holder which may be released for retraction from the driver's seat or instrument board of the vehicle, a tag holder which is normally urged toward retracted position, a tag holder which will be locked in a novel manner when in the retracted position, to provide novel means to guard the lock against tampering, and to generally provide the novel details, combinations and arrangements of the parts as hereinafter more specifically described with relation to accompanying drawings illustrating an operative embodiment.

In said drawings:—

Figure 1 in elevation, which may be regarded as front or rear, illustrates my improvements, the same being partly broken away to disclose details, and the tag in its lawful position being shown in full line and in the retracted position being shown in raised or dotted line;

Figure 2 is a vertical sectional view taken on the line 2—2 of Figure 1;

Figure 3 is a sectional view taken on the line 3—3 of Figure 1;

Figure 4 is a sectional view taken on the line 4—4 of Figure 3;

Figure 9 is a sectional view taken on the line 9—9 of Figure 5;

Figure 10 is a sectional view taken on the line 10—10 of Figure 6;

Figure 11 is a sectional view taken on the line 11—11 of Figure 3;

Figure 12 is a sectional view taken on the line 12—12 of Figure 6;

Figure 13 is a sectional view taken on the line 13—13 of Figure 5;

Figure 14 is a fragmentary elevation, similar to Figure 6 with the parts in a different position;

Figure 15 is a sectional view taken on the line 15—15 of Figure 5, and

Figure 16 is a detail elevation of the key.

Figure 5:
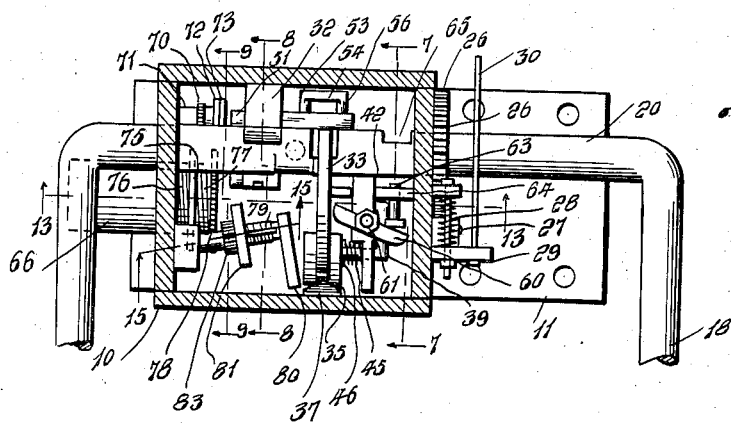
Figure 5 is a view in elevation, with the casing and associated parts removed to disclose details, the holder being in lawful or lowered position.
Figure 6:
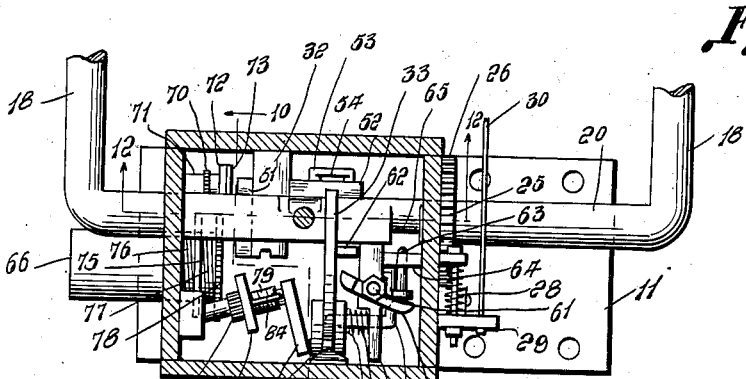
Figure 6 is a view similar to Figure 5 but showing the holder in the raised or retracted position.
Figure 7:
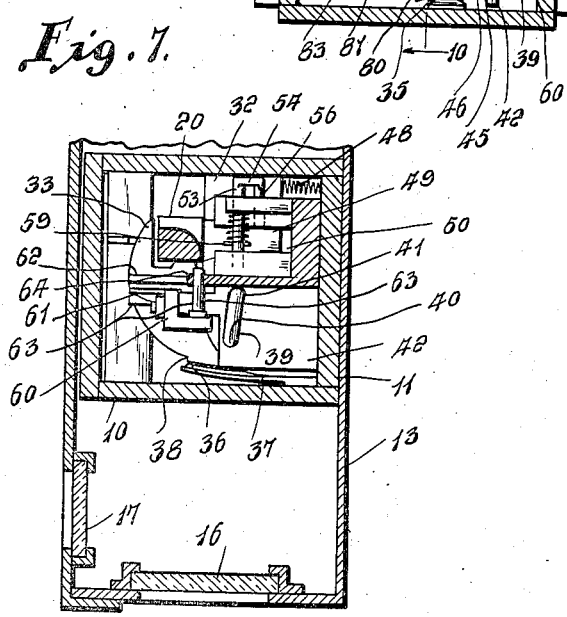
Figure 7 is a sectional view taken on the line 7—7 of Figure 5.
Figure 8:
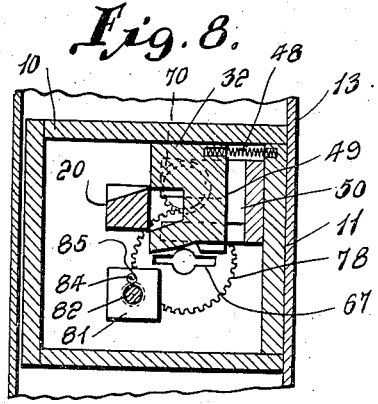
Figure 8 is a sectional view taken on the line 8—8 of Figure 5.

Referring specifically to the drawings wherein like reference characters designate like or similar parts, 10 designates a suitable casing mounted in any suitable way as by means of its rear wall 11 which serves as an attaching plate and which is riveted or otherwise fastened as at 12 to a suitable housing 13, which may be a signal housing attachable on either the front or rear or both of an automobile or other vehicle and which at the lower end has an illuminating chamber 14 in which a lamp 15 is provided, the chamber having windows 16 and 17 through its walls, so as to illuminate a license tag or plate 17ᵃ.

Said license tag is carried by a holder 18 of any suitable shape or material, for instance being made of wire and the license plate being attached thereto by removable screws, bolts or the like at 19. Said frame or holder 18 has a transverse shaft or portion 20 which passes through and is journaled in the end wall of the casing 10 and the housing 13. The license plate 17ᵃ and its holder 18 are shown in the legal or lowered or display position in full lines in Figures 1 and 2. A contractile coil spring or the equivalent 21 is attached as at 22 to the shaft 20 and as at 23 to a suitable support such as the housing 13, in order to normally urge the license plate 17ᵃ and holder 18 from the full line position to the retracted or dotted line position of Figure 1, wherein the display face of the license tag will be concealed so as to apprize an officer or others of the fact that an automobile to which the device is attached is being used without authority. The holder and license tag are held in the legal or lowered position through the co-action of a pawl 24 with teeth 25 of a ratchet 26 rigid on the shaft 20. The pawl 24 is pivoted to the casing 10 as at 27 and it is urged normally into engagement with adjacent teeth 25 by an expansive spring device 28.

Said pawl 24 has an ear 29 to which a flexible draw member such as a cable 30 is fastened and which draw member, guided by any suitable means, extends exteriorly of the casing 10 and to the instrument board of the automobile or vehicle equipped with the device, so that the operator thereof, preparatory to alighting, may pull the cable 30, thereby disengaging the pawl 24 from the ratchet 26 and thus leaving the spring 21 free to retract the frame and license plate from the full line to the dotted line position as in Figure 1. It will be realized that the frame 18 and tag 17a carried thereby will be automatically locked through the retracting movement to the dotted line position of Figure 1, requiring the use of a key 31, before the frame 18 can be unlocked and thereafter manually lowered to the full line position of Figures 1 and 2, wherein the ratchet 26 is automatically engaged by the pawl 24 and held in such lowered or legal position.

In the said retracted position shown in dotted lines in Figure 1, the frame is locked primarily through the engagement of a U-shaped slidable bolt 32 with the shaft 20 and also by a locking lever 33, engaging the shaft from the opposite side to the U-bolt 32. Lever 33 is pivotally mounted at 34 in a saddle shaped bracket 35 attached to the said plate 11. Locking lever 33 is adapted to be retracted through the turning of the key 31 against the same as suggested in Figure 10 and it is adapted to be held in retracted position by the engagement of a projection 36, on a spring finger 37 fastened to the bracket 35, with a shoulder 38 of the locking lever. The said locking lever is held against accidental retraction from its locked position by a U-shaped latch member 39 which is slidable and has its legs 40 and 41, slidably mounted in a wall or support 42, fixed to the aforesaid wall 11. Leg 40 projects slidably through an opening 43 in the bracket 35 and has a rounded end which projects into an opening 44 of the lock lever 33. Latch 39 is urged into such position through the medium of an expansive coil spring 45 surrounding leg 40 between the support 42 and a pin or abutment 46 on the leg. The shorter leg 41 extends into a recess 47 of the support or wall 42.

Said U-shaped or bifurcated bolt 32 is urged into locking position by an expansive spring 48 and such bolt has lateral wings 49 slidably mounted in slots 50 of the fixed bracket or wall 42 as parallel guide projections at 51 and 52, as best shown in Figure 3. Such bifurcated bolt 32 is held against retraction due to the projection of a leg 53 of a guard 54, into one of the slots 50 in the path of retraction of such bolt 32. Leg 53 is vertically slidable in a slot 55 in the wall or guide 52. The guard 54 also has a leg 56 which is slidable in suitable openings in said guide or wall 55 and one end thereof projects into the aforesaid recess 47. A spring 58 surrounds the leg 56 and abuts a pin 59 thereon and a fixed part such as the wall 55 to maintain the guard 54 in lowermost position.

In order to break the connection between the detent 37 with lock lever 33 at 36 and 38, when the frame 18 and tag 17a are moved to retracted position, a trip lever 60 is pivoted at 61 on a vertical axis, to bracket or wall 42 and lock lever 33 has a projection or lug 62 which engages one end of said lever 60, as shown in Figure 14, when the lock lever is retracted, so as to swing the lever and cause the other end to engage a pin 63, which is slidably mounted by a projection 64 on said bracket 42, moving it into a cam or cutaway portion 65 of the shaft 20, such shaft for the most part being substantially square or rectangular in cross section as shown.

Slidable and journaled in one end wall of the casing 10 is a cylinder 66 having an opening 67 therethrough corresponding in cross section to that of the key 31, permitting the latter to be passed therethrough and its forward end to enter the recess 47. With the frame and tag locked in the retracted or dotted line position as in Figure 1, insertion of the key through the cylinder 66 as suggested in Figure 13, engages the legs 41 and 56, imparting movement thereto against the tension of their springs and retracting the leg 40 out of the recess 44 of the lock lever 33 and moving the leg 53 out of the path of retraction of the bifurcated bolt member 32. Thereupon, as suggested in Figure 10, the key 31 is turned to the right engaging and moving the lock lever 33 away from the shaft 20 to a position where the lug 36 snaps into engagement with the shoulder 38 and maintains the lock lever 33 retracted or disengaged from the shaft 20. Rocking of such key 31 in the reverse direction, that is to the left, causes it to engage the bolt 32 at a cut-out portion 68 whereupon the tag and frame are manually engaged and swung downwardly on the axis of the shaft 20 to the full line position of Figure 1, during which the pawl 24 engages and co-acts with the teeth 25 of the ratchet to hold the tag in such lawful position. At the same time, the rotation of the square portion of shaft 20 causes a portion thereof to overlap the slot or bifurcation of the bolt 32, thus maintaining it retracted. The latch lever 33 also remains retracted.

In the said lawful or lowered position of the frame 18 and tag 17a, it is maintained only by the engagement of the pawl 24 with the teeth 25, the spring 21 tending to pull the frame and tag to the retracted position and will do so when the draw element 30 is operated to disengage the pawl 24 from the teeth 25. As the frame 18 swings upwardly to retracted position, the shaft 20 rotates with the adjacent portion thereof engaging the pin 63 and shifting lever 60, detent 37 and lock lever 33, whereupon when the shaft 20 is in the retracted position the lock lever will automatically engage it and the bolt 32 will be released and will automatically engage the shaft 20, the latch 39 and guard 54 also being released and moving to normal positions, respectively, lockingly engaging the lock lever 33 and moving into the path of retraction of bolt 32.

A leaf spring 68 may also be employed to urge locking movement of the bolt 32.

The key cylinder 66 is adapted to be manually operated to actuate means which will prevent the insertion of keys or attempts to tamper with the lock, by parties unfamiliar with its structure or its adjustment. To this end, a gear member or pinion 70 is pivoted at 71 to the casing 10 and it carries a plate 72 to which a guard plate 73 is eccentrically pivoted as at 74. Cylinder 66 slides through a support 75 on opposite sides of which are coil compression springs 76 and 77, the former abutting the support 75 and a wall of the casing 10 and the latter abutting the support 75 and a gear rim 78 on the cylinder. The normal position is shown in Figure 11. Such cylinder 66 may be manually engaged and pulled outwardly against the tension of the springs, with the gear teeth 78 engaging those of the pinion 70 and the cylinder being rotated so that the guard 73 will fall into a position opposite the opening 67, as shown in Figure 9, and thus offering an obstruction to the insertion of a key. It will be realized, that normally, the pinion 70 and plate 72 will be in a position with the pivot 74 uppermost and the guard 73 suspended above the opening 67 and thus not offering interference with the insertion of the key.

Still another guard means may be provided to thwart the insertion of an unauthorized key.

In this connection a stationary screw stud 79 is fixed to an upright 80 rigid on the plate 11. A plate 81, serving as a guard, is screw threaded on the stud 79 and the plate may be square, rectangular or any other desired shape. The stud has a pin 82 projecting from it on which a pinion 83 is journaled and the pinion has a longitudinally extending rod 84, rigid therewith, and passing loosely through an opening 85 in the guard 81. Such cylinder 66 may be pressed inwardly against the tension of the spring 76 with the teeth 78 meshing with the teeth of the pinion 83 and thereupon turned, to slide the guard 81 along the screw stud 79 to any desired position so as to be in the path of insertion of a key through the slot 67. It will be realized that the operator of the vehicle will know how to operate the cylinder 66 in order to place both the guard 73 and the guard 81 out of line with the opening 67.

Various changes may be resorted to provided they fall within the spirit and scope of the invention.

I claim as my invention:—

1. Apparatus of the class described comprising a casing, a frame to display a tag or the like, said frame having a shaft journaled in the casing at each end extending exteriorly thereof, the frame having elements exteriorly of the casing connected to the opposite ends of the shaft to enable the frame to be moved to position the tag above and below the casing, means connected with the shaft urging retraction of the frame, mechanism to maintain the frame in a display position, and a device operable to release the mechanism to enable retraction of the frame.

2. Apparatus of the class described comprising a frame to display a license tag or the like, said frame having a shaft, means connected with the shaft and urging retraction of the frame, pawl and ratchet means to maintain the frame in a display position, and draw means operable to release the pawl and ratchet means to enable retraction of the frame.

3. Apparatus of the class described comprising a casing, a frame to display a tag or the like, said frame having a shaft journaled in the casing at each end extending exteriorly thereof, the frame having elements exteriorly of the casing connected to the opposite ends of the shaft to enable the frame to be moved to position the tag above and below the casing, means connected with the shaft urging retraction of the frame, mechanism to maintain the frame in a display position, a device operable to release the mechanism to enable retraction of the frame, said mechanism including a pawl and ratchet.

VENT MORGAN LYLE.